United States Patent
Sims (10) Patent No.: US 12,508,067 B2
(45) Date of Patent: Dec. 30, 2025

(54) SMOKE EVACUATION INSTRUMENT WITH ILLUMINATION NOZZLE

(71) Applicant: Covidien LP, Mansfield, MA (US)

(72) Inventor: Grant T. Sims, Boulder, CO (US)

(73) Assignee: Covidien LP, Mansfield, MA (US)

( * ) Notice: Subject to any disclaimer, the term of this patent is extended or adjusted under 35 U.S.C. 154(b) by 665 days.

(21) Appl. No.: 17/888,550

(22) Filed: Aug. 16, 2022

(65) Prior Publication Data

US 2023/0107451 A1    Apr. 6, 2023

Related U.S. Application Data

(60) Provisional application No. 63/251,765, filed on Oct. 4, 2021.

(51) Int. Cl.
*A61B 18/14* (2006.01)
*A61B 90/30* (2016.01)
*A61B 18/00* (2006.01)

(52) U.S. Cl.
CPC .......... *A61B 18/1477* (2013.01); *A61B 90/30* (2016.02); *A61B 2018/00958* (2013.01); *A61B 2218/008* (2013.01); *A61B 2560/0418* (2013.01)

(58) Field of Classification Search
CPC ................ A61B 18/12; A61B 18/1477; A61B 2018/00577; A61B 2018/00601; A61B 2018/00958; A61B 2018/1412; A61B 2090/306; A61B 2090/309; A61B 2218/008; A61B 2560/0418; A61B 90/30
See application file for complete search history.

(56) References Cited

U.S. PATENT DOCUMENTS

| | | | |
|---|---|---|---|
| 9,237,922 B2 * | 1/2016 | Bromley | A61B 18/1402 |
| 9,375,253 B2 * | 6/2016 | Greep | A61C 1/00 |
| 10,456,190 B2 * | 10/2019 | Vayser | A61B 90/30 |
| 10,499,974 B2 * | 12/2019 | Heim | A61B 18/1402 |
| 10,765,472 B2 | 9/2020 | Greep et al. | |
| 2006/0217596 A1 | 9/2006 | Williams | |
| 2006/0264928 A1 | 11/2006 | Kornerup et al. | |

(Continued)

FOREIGN PATENT DOCUMENTS

WO    2021094829 A1    5/2021

OTHER PUBLICATIONS

European Search Report dated Mar. 2, 2023, issued in corresponding European Application No. 22199430, 11 pages.

*Primary Examiner* — Michael F Peffley
(74) *Attorney, Agent, or Firm* — Carter, DeLuca & Farrell LLP (57) ABSTRACT

An electrosurgical smoke evacuation pencil includes a handle housing, a suction conduit, an electrode, and a nozzle. The handle housing has a proximal end portion and a distal end portion and defines a lumen therethrough. The suction conduit is coupled to the handle housing and is configured to couple the electrosurgical pencil to a smoke evacuator. The electrode extends from the distal end portion of the handle housing and is configured to couple to a source of electrosurgical energy. The nozzle extends from the distal end portion of the handle housing and defines a lumen in fluid communication with the lumen of the handle housing. The nozzle is configured to transmit light from a light source through the nozzle and out of a distal end of the nozzle to form a light path illuminating therefrom.

16 Claims, 5 Drawing Sheets

(56) References Cited

U.S. PATENT DOCUMENTS

| | | | |
|---|---|---|---|
| 2012/0101497 A1* | 4/2012 | Jayaraj | A61B 90/35 606/45 |
| 2012/0283728 A1* | 11/2012 | Cosmescu | A61B 18/1477 606/45 |
| 2014/0276763 A1 | 9/2014 | Greep et al. | |
| 2018/0078301 A1* | 3/2018 | Vayser | A61B 18/1402 |
| 2018/0333201 A1 | 11/2018 | Greep et al. | |
| 2021/0022796 A1 | 1/2021 | Kleyman et al. | |
| 2022/0117649 A1* | 4/2022 | Reiterer | A61B 18/1482 |

* cited by examiner

SMOKE EVACUATION INSTRUMENT WITH ILLUMINATION NOZZLE

CROSS-REFERENCE TO RELATED APPLICATIONS

This application claims the benefit of the filing date of provisional U.S. Patent Application No. 63/251,765 filed on Oct. 4, 2021.

FIELD

The disclosure relates to surgical devices. More specifically, the disclosure relates to handheld smoke evacuation electrosurgical pencils with illumination nozzles.

BACKGROUND

Electrosurgical (ES) pencils are used in surgery, typically for cutting tissue and/or for coagulating blood vessels. An ES pencil usually includes a handpiece into which electrodes of various shapes and sizes may be placed. The ES pencil is coupled to an ES generator, such as Medtronic's Valleylab™ FX8 or FT10 generator, which supplies the electrode with a high frequency, typically radio frequency (RF) alternating current. The ES generator may supply various waveforms suitable for achieving various surgical effects, such as cutting, coagulating, blending, spraying, fulgurating, and the like.

While using an ES pencil, smoke is often generated. An effective way to evacuate surgical smoke is to use an ES pencil with an integrated smoke evacuation nozzle in conjunction with a suction device and an ultra-low penetration air (ULPA) filter. Conventional ES pencils rely on smoke evacuation shrouds attached to the ES pencil, which suction the smoke away via a suction device. Smoke shrouds are available either as an integrated part of the ES pencil or as a separate shroud attached to the ES pencil. A smoke nozzle, situated near the pencil's electrode, draws the smoke plume into and through the pencil's body, through a long flexible hose, and finally into a powered suction device outside of the surgical field.

During a surgical procedure, it is often desirable to illuminate the surgical site with an illumination device to increase visibility of the surgical site.

SUMMARY

The disclosure provides an electrosurgical (ES) pencil, and a surgical smoke evacuation system including an ES pencil, having a handle housing and a smoke nozzle, which may be removable, integrated, and/or telescopic relative to the handle housing and which is a light conduit for transferring light from a light source to the surgical site.

In accordance with embodiments of the disclosure, an ES smoke evacuation pencil includes a handle housing, a suction conduit, an electrode, and a nozzle. The handle housing has a proximal end portion and a distal end portion and defines a lumen therethrough. The suction conduit is coupled to the handle housing and is configured to couple the electrosurgical pencil to a smoke evacuator. The electrode extends from the distal end portion of the handle housing and is configured to couple to a source of electrosurgical energy. The nozzle extends from the distal end portion of the handle housing and defines a lumen in fluid communication with the lumen of the handle housing. The nozzle is configured to transmit light from a light source through the nozzle and out of a distal end of the nozzle to form a light path illuminating therefrom.

In an aspect, the electrode is disposed within the lumen defined by the nozzle.

In an aspect, the distal end of the nozzle includes an angled tip configured to cause the light path to illuminate away from a central longitudinal axis of the nozzle.

In an aspect, the nozzle is rotatable relative to the handle housing to direct the light path illuminating away from the central longitudinal axis of the nozzle.

In an aspect, the ES smoke evacuation pencil includes an activator switch operably coupled to the handle housing and configured to activate the light source.

In an aspect, the activator switch is an adjustable switch configured to vary an intensity of the light path illuminating from the distal end of the nozzle.

In an aspect, the nozzle is a multi-tube nozzle including a first tube and a second tube. The first tube is configured to illuminate diffused light therefrom and the second tube is configured to illuminate focused light therefrom. Additionally, or alternatively, the first tube may be configured to transmit light at a first wavelength therethrough and the second tube may be configured to transmit light at a second wavelength therethrough.

In an aspect, a distal end of the nozzle defines an inward tapered surface and an outward tapered surface forming a ridge configured to direct light away from a central longitudinal axis of the nozzle and toward the central longitudinal axis of the nozzle.

In an aspect, a distal end of the nozzle defines an inward tapered surface configured to direct light toward a central longitudinal axis of the nozzle.

In an aspect, a distal end of the nozzle defines an outward tapered surface configured to direct light away from a central longitudinal axis of the nozzle.

In an aspect, a distal end of the nozzle defines two inward tapered surfaces forming a valley.

In accordance with aspects of the disclosure, a surgical smoke evacuation system includes a smoke evacuator including a suction generator configured to create a vacuum pressure and an electrosurgical pencil configured to operably couple to the smoke evacuator. The electrosurgical pencil includes a handle housing, a suction conduit, an electrode, and a nozzle. The handle housing has a proximal end portion and a distal end portion and defines a lumen therethrough. The suction conduit is coupled to the handle housing and is configured to couple the electrosurgical pencil to the smoke evacuator. The electrode extends from the distal end portion of the handle housing and is configured to couple to a source of electrosurgical energy. The nozzle extends from the distal end portion of the handle housing and defines a lumen in fluid communication with the lumen of the handle housing. The nozzle is configured to transmit light from a light source through the nozzle and out of a distal end of the nozzle to form a light path illuminating therefrom.

In an aspect, the distal end of the nozzle includes an angled tip configured to cause the light path to illuminate away from a longitudinal axis of the nozzle and the nozzle is rotatable relative to the handle housing to direct the light path illuminating away from the longitudinal axis of the nozzle.

In an aspect, the electrosurgical pencil includes an activator switch operably coupled to the handle housing and configured to activate the light source. The activator switch is an adjustable switch configured to vary an intensity of the light path illuminating from the distal end of the nozzle.

In an aspect, the nozzle is a multi-tube nozzle including a first tube and a second tube. The first tube may be configured to transmit light at a first wavelength therethrough and the second tube may be configured to transmit light at a second wavelength therethrough.

In an aspect, a distal end of the nozzle defines an inward tapered surface and an outward tapered surface forming a ridge configured to direct light away from a central longitudinal axis of the nozzle and toward the central longitudinal axis of the nozzle.

In an aspect, a distal end of the nozzle defines two inward tapered surfaces forming a valley.

In another aspect of the disclosure, an ES smoke evacuation pencil includes a handle housing, a suction conduit, an electrode, a light source, and a nozzle. The handle housing has a proximal end portion and a distal end portion and defines a lumen therethrough. The suction conduit is coupled to the handle housing and is configured to couple the electrosurgical pencil to a smoke evacuator. The electrode extends from the distal end portion of the handle housing and is configured to couple to a source of electrosurgical energy. The light source is disposed within the handle housing and configured to illuminate light. The nozzle extends from the distal end portion of the handle housing and defines a lumen in fluid communication with the lumen of the handle housing. The nozzle is configured to transmit light from the light source through the nozzle and out of a distal end of the nozzle to form a light path illuminating therefrom.

In an aspect, the distal end of the nozzle includes an angled tip configured to cause the light path to illuminate away from a longitudinal axis of the nozzle and the nozzle is rotatable relative to the handle housing to direct the light path illuminating away from the longitudinal axis of the nozzle.

BRIEF DESCRIPTION OF THE DRAWINGS

Aspects of the disclosure are described herein with reference to the accompanying drawings, wherein.

DETAILED DESCRIPTION OF ASPECTS

Embodiments of the disclosure are now described in detail with reference to the drawings in which like reference numerals designate identical or corresponding elements in each of the drawings. The aspects may be combined in any manner consistent with the functionality of the apparatus and/or method disclosed herein. As used herein, the term "clinician" refers to a doctor, a nurse or any other care provider and may include support personnel. Throughout this description, the term "proximal" will refer to the portion of the device or component thereof that is closer to the clinician and the term "distal" will refer to the portion of the device or component thereof that is farther from the clinician. The terms "substantially equal to" or "substantially the same" denote values that are within ±5% of each other. Additionally, in the drawings and in the description that follows, terms such as front, rear, upper, lower, top, bottom, and similar directional terms are used simply for convenience of description and are not intended to limit the disclosure. In the following description, well-known functions or constructions are not described in detail to avoid obscuring the disclosure in unnecessary detail.

Figure 1:
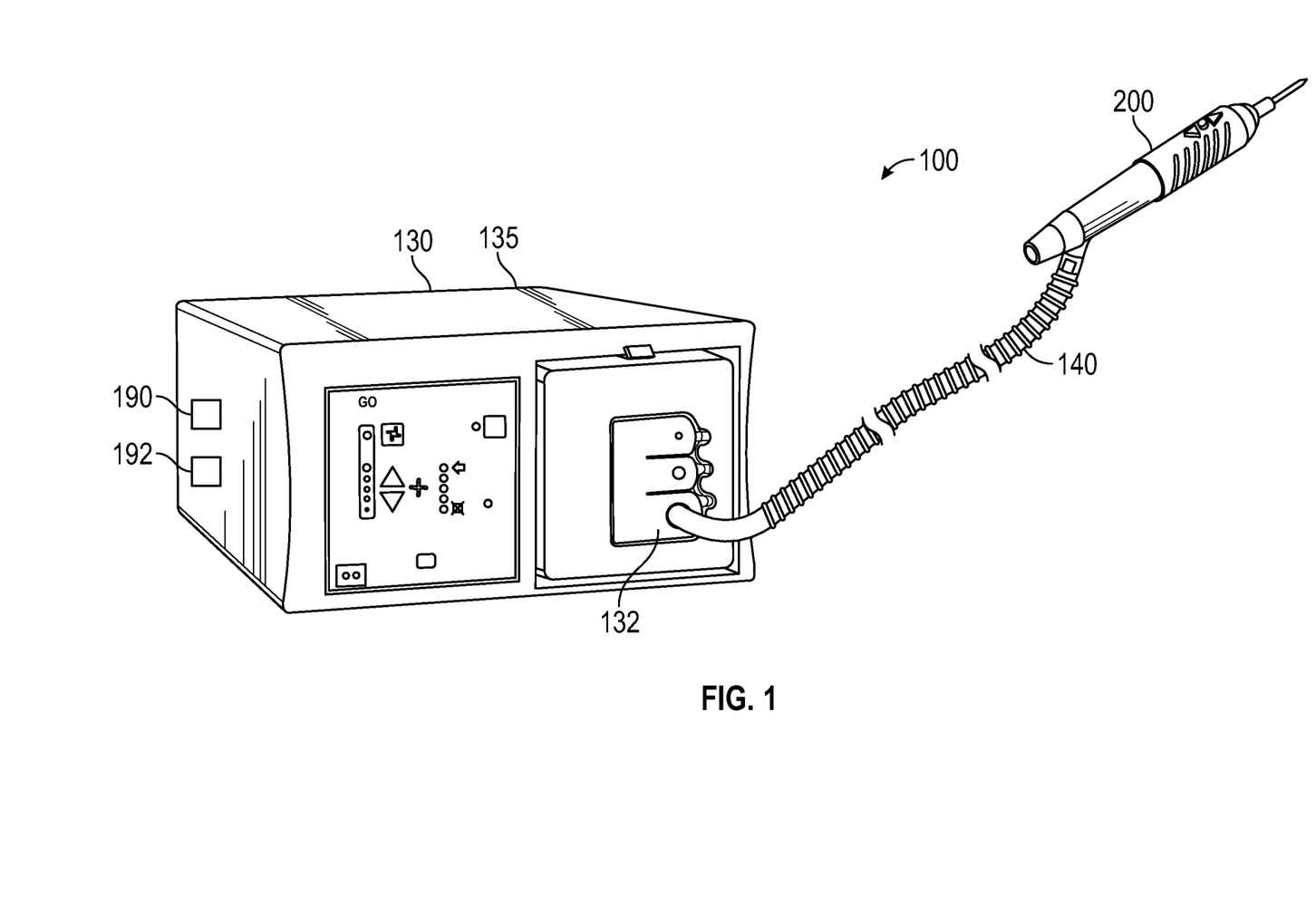
FIG. 1 is a perspective view of a surgical smoke evacuation system, in accordance with the disclosure.

With reference to FIG. 1, a surgical smoke evacuation system 100 is shown. The surgical smoke evacuation system 100 generally includes a smoke evacuator 130, an ES pencil 200 (FIG. 2), and a suction conduit 140 connecting the ES pencil 200 to the smoke evacuator 130.

The smoke evacuator 130 includes a suction generator 135 that creates negative pressure having a set vacuum force for removing smoke during a surgical operation. The suction conduit 140 is connected to the ES pencil 200 at its distal end and to an inlet port 132 of the smoke evacuator 130 at its proximal end. The suction generator 135 may include one or more fans and/or pumps to create the negative pressure enabling smoke removal from a surgical site.

The smoke evacuator 130 also includes a processor 190 and a memory 192. Instructions may be executed by the processor 190, which may include one or more digital signal processors (DSPs), general-purpose microprocessors, application-specific integrated circuits (ASICs), field programmable logic arrays (FPGAs), or other equivalent integrated or discrete logic circuitry. Accordingly, the term "processor" as used herein may refer to any of the foregoing structures or any other physical structure suitable for implementation of the described techniques. Also, the techniques could be fully implemented in one or more circuits or logic elements. It is contemplated that the processor 190 and memory 192 may be located in the smoke evacuator 130, the ES pencil 200, and/or in a remote computer system.

In one or more examples, the described techniques may be implemented in hardware, software, firmware, or any combination thereof. If implemented in software, the functions may be stored as one or more instructions or code on a computer-readable medium and executed by a hardware-based processing unit. Computer-readable media may include non-transitory computer-readable media, which corresponds to a tangible medium such as data storage media (e.g., RAM, ROM, EEPROM, flash memory, or any other medium that can be used to store desired program code in the form of instructions or data structures and that can be accessed by a computer).

Figure 2:
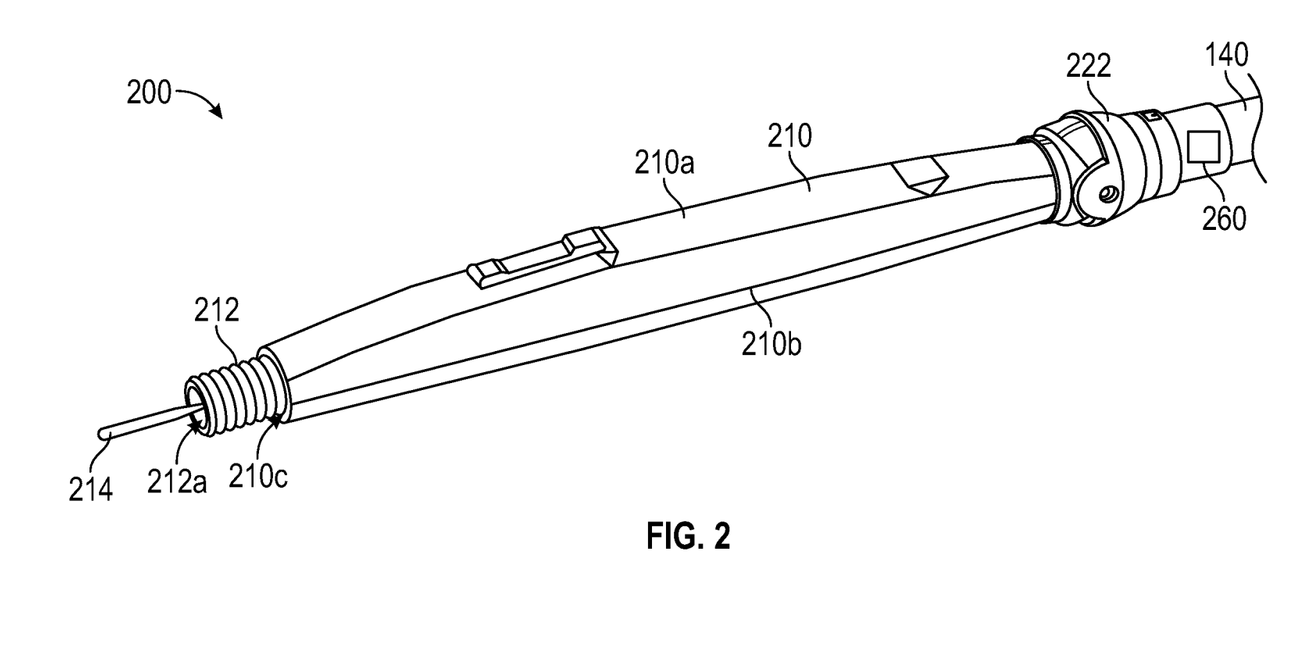
FIG. 2 is a perspective view of a smoke evacuation electrosurgical (ES) pencil of the surgical smoke evacuation system of FIG. 1, in accordance with the disclosure.
Figure 3:
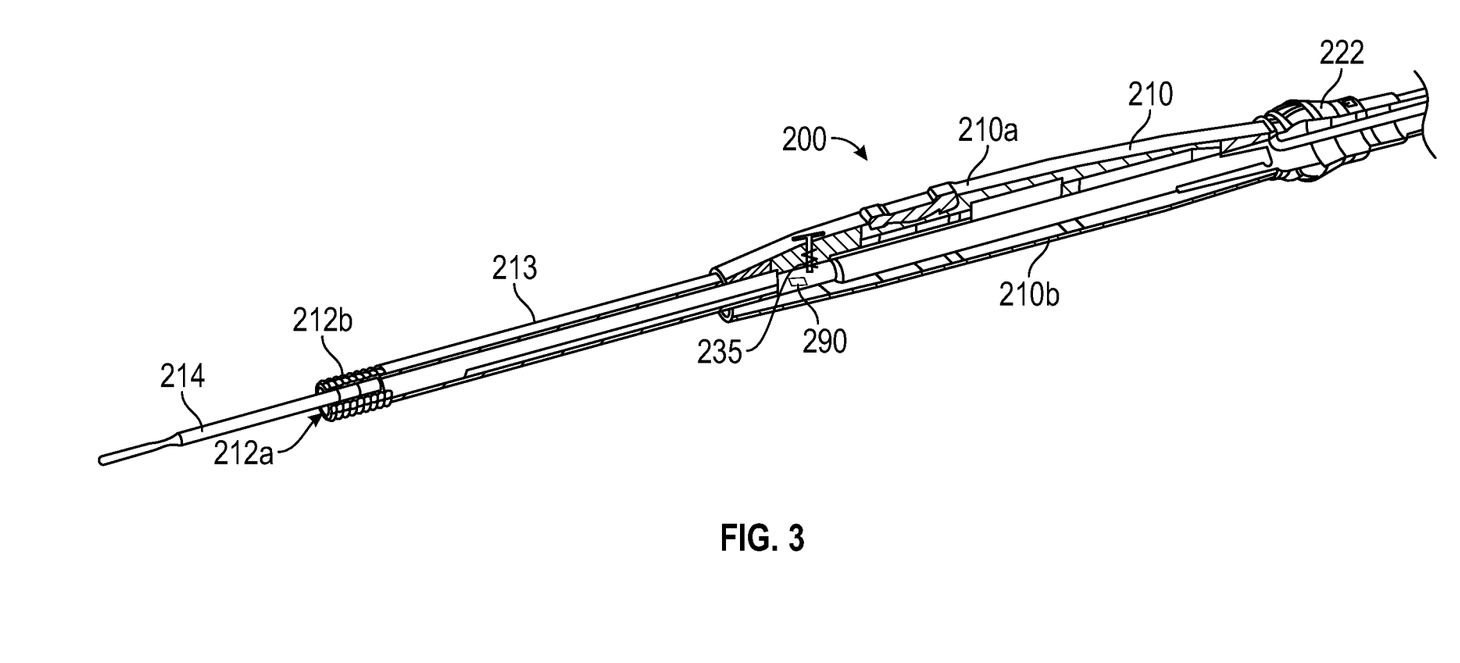
FIG. 3 is a perspective, cross-sectional view of the ES pencil of the surgical smoke evacuation system of FIG. 1 with a nozzle extender attachment according to the disclosure.

Referring to FIGS. 2 and 3, the ES pencil 200 includes a handle housing 210 formed from a thermoplastic material. The handle housing 210 includes an upper portion 210a and a lower portion 210b, which are secured to each other using any suitable method (e.g., ultrasonically welding) to secure internal components of the ES pencil 200. The handle housing 210 defines a lumen 210c therethrough. The ES pencil 200 also includes a nozzle 212 that may be removably or securely coupled within the housing 210 and an electrode 214 disposed within, and extending through, a lumen 212a defined by the nozzle 212. The lumen 212a defined by the nozzle 212 is in fluid communication with the lumen 210c defined by the handle housing 210.

The nozzle 212 may be formed from a dielectric material, such as polyimide, and provides for the suctioning of gaseous byproducts through the handle housing 210. In aspects, the dielectric material of the nozzle 212 may be a transparent, substantially transparent, or translucent material configured to facilitate visual acuity in the surgical field. However, it will be clear that an opaque or substantially opaque material may also be used as such materials would not affect the operation of the device. As described in greater detail below, the nozzle 212 is disposed relative to a light source 290 and acts as a light conduit for transmitting light from the light source 290 to the surgical site.

The ES pencil 200 also includes a connector 222 (e.g., a swivel connector) coupling the nozzle 212 to the suction conduit 140. As shown in FIG. 3, the nozzle 212 may also include a distal end portion 212b, which may be configured to couple to a nozzle extender attachment 213. The distal end portion 212b may have a plurality of ribs 212c for frictionally engaging the nozzle extender attachment 213. This allows the ES pencil 200 to have a longer nozzle 212 to use with a longer electrode 214 for deeper access.

Figure 4:
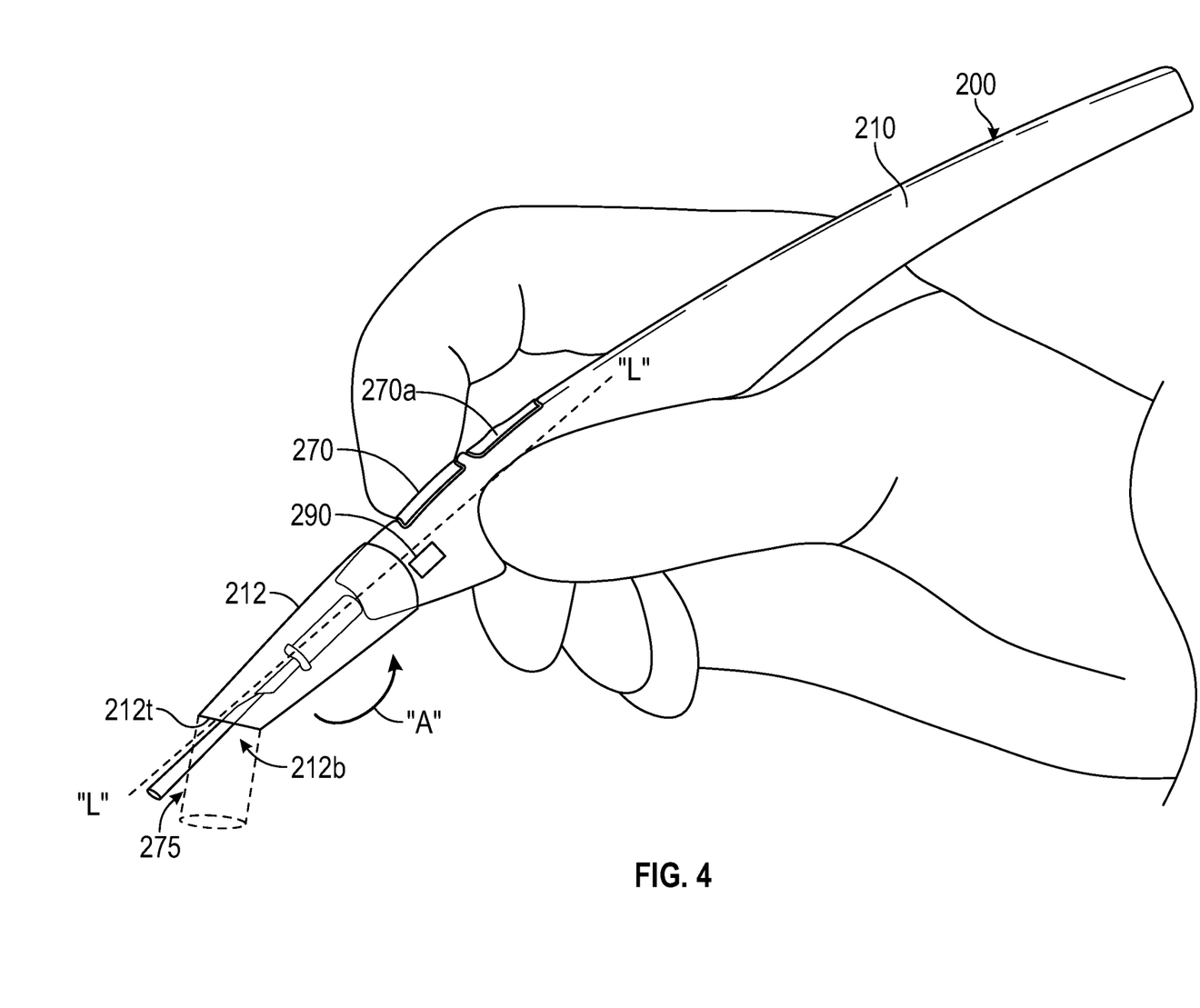
FIG. 4 is a perspective view of the ES pencil of the surgical smoke evacuation system of FIG. 1 with a light transmitting nozzle having an angled tip in accordance with aspects of the disclosure.

Turning now to FIG. 4, the ES pencil 200 further includes a light source 290 configured to generate light and, optionally, an activator switch 270 configured to control and adjust the illumination intensity of the light source 290. The activator switch 270 may be a slidable switch, a knob, or any other suitable structure capable of controlling the output intensity of the light source 290. Additionally, or alternatively, rotation of the nozzle 212 may activate and/or adjust the intensity of light. The light source 290 may be any device capable of generating visible or non-visible light and may be capable of outputting light at various wavelengths and is operably coupled to a power source (e.g., a battery or other internal or external power source). In embodiments, the light source 290 may include one or more light emitting diodes (LEDs) configured to output light in a visible spectrum from about 380 nm to about 750 nm. In further embodiments, the light source 290 may emit light in the near infrared spectrum from about 780 nm to about 1200 nm, such light may be used to identify specific tissue structures during surgery. The ES pencil 200 may also include a wavelength (e.g., color) selection switch 270a to select a suitable wavelength of the light. In an aspect, one or more filters (not shown) may be included to isolate certain wavelengths.

The nozzle 212 is positioned relative to the light source 290 so as to transfer light from the light source 290 through the nozzle 212, and out of the distal end portion 212b of the nozzle 212 into the surgical site to create an illumination pattern (e.g., shaped, focused, spot, beam, diffused, etc., or any combinations thereof) to be reflected off of a surface of the surgical site. Such illumination increases the clinician's visibility of the surgical site and in some configurations may provide other visual insight to the clinician.

In one example, as shown in FIG. 4, the distal end portion 212b of the nozzle 212 includes an angled tip 212t which offsets the illuminating light path 272 away from a central longitudinal axis "L" of the nozzle 212. The nozzle 212 may be rotatable relative to the handle housing 210 (e.g., in the direction of arrow "A") such that rotation of the nozzle 212 causes corresponding rotation of the light path 275 relative to, and around, the central longitudinal axis "L" of the nozzle 212. During use, the clinician may rotate the nozzle 212 to direct the light path 272 to a different area while maintaining the position of the electrode 214.

In addition to, or in leu of, being rotatable and/or having an angled tip 212t, the nozzle 212 may have a distal end portion 212b formed to various shapes to direct light out of the distal end portion 212b of the nozzle 212 in different ways, for example, as illustrated in the examples shown in FIGS. 5A-5E and described below. Any of the embodiments may have an angled tip, a non-angled (e.g., horizontal) tip, a shaped tip, or any combinations thereof. Additionally, or alternatively, the tip shape (e.g., angled, non-angled, etc.) may be defined on one or both of the proximal end of distal end of the nozzle 212.

Figure 5A:
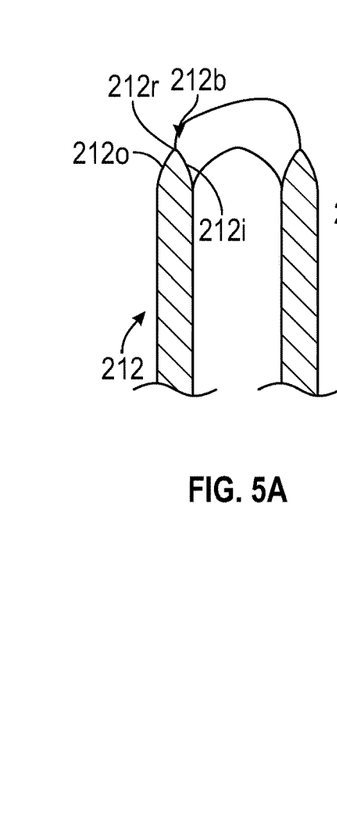
FIG. 5A is a side, cross-sectional, view of a light transmitting nozzle of the ES pencil of the surgical smoke evacuation system of FIG. 1 with a distal tip having two tapered surfaces defining a ridge in accordance with an aspect of the disclosure.

FIG. 5A illustrates a nozzle 212 in which the distal end portion 212b includes an inward tapered surface 212i (tapering toward the central longitudinal axis "L" of the nozzle 212) and an outward tapered surface 212o (tapering away from central longitudinal axis "L" of the nozzle 212) meeting at an apex to form a ridge 212r at the distal end portion 212b of the nozzle 212. Specifically, the inward tapered surface 212i tapers down from the ridge 212r toward an inner surface of the nozzle 212 and the outward tapered surface 212o tapers down from the ridge 212r to an outer surface of the nozzle 212. The inward tapered surface 212i directs light toward the central longitudinal axis "L" of the nozzle 212 and the outward tapered surface 212o directs light away from the central longitudinal axis "L" of the nozzle 212, in opposite directions, to form a diffused light pattern to be reflected off of a surface of the surgical site. In an aspect, the inward tapered surface 212i and/or the outward tapered surface 212o may be formed along only a portion of the circumference of the distal end portion 212b of the nozzle 212 to create a shaped (e.g., half-moon shaped) spotlight pattern to be reflected off of a surface of the surgical site.

Figure 5B:
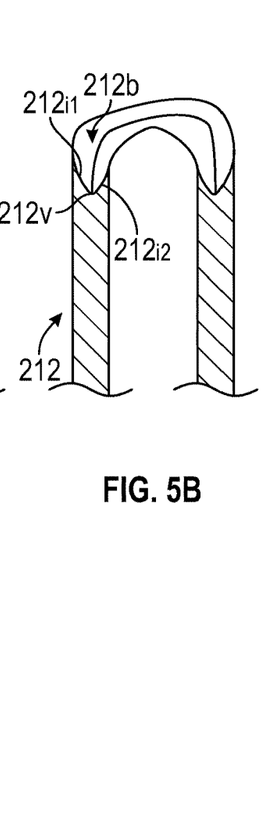
FIG. 5B is a side, cross-sectional, view of a light transmitting nozzle of the ES pencil of the surgical smoke evacuation system of FIG. 1 with a distal tip having two tapered surfaces defining a valley in accordance with an aspect of the disclosure.

FIG. 5B illustrates a nozzle 212 in which the distal end portion 212b includes two inward tapered surfaces, first inward tapered surface $212_{i1}$ (tapering toward the central longitudinal axis "L" of the nozzle 212) and second inward tapered surface $212_{i2}$ (tapering away from the central longitudinal axis "L" of the nozzle 212) meeting at a bottom to form a valley 212v at the distal end portion 212b of the nozzle 212. The first inward tapered surface $212_{i1}$ tapers down from an outer surface of the nozzle 212 and the second inward tapered surface $212_{i2}$ tapers down from an inner surface of the nozzle 212. The first inward tapered surface $212_{i1}$ directs light toward the central longitudinal axis "L" of the nozzle 212 and toward the second inward tapered surface $212_{i2}$ and the second inward tapered surface $212_{i2}$ directs light away from the central longitudinal axis "L" of the nozzle 212 and toward the first inward tapered surface $212_{i1}$ to form a focused or shaped light pattern to be reflected off of a surface of the surgical site. In an aspect, one or both of the first inward tapered surface $212_{i1}$ and the second inward tapered surface $212_{i2}$ may be formed along only a portion of the circumference of the distal end portion 212b of the nozzle 212 to create a shaped (e.g., half-moon shaped) spotlight pattern to be reflected off of a surface of the surgical site.

Figure 5C:
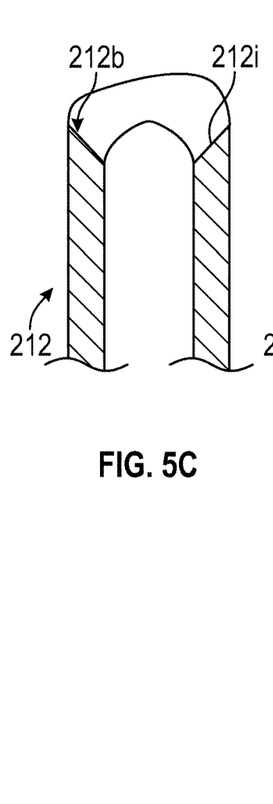
FIG. 5C is a side, cross-sectional, view of a light transmitting nozzle of the ES pencil of the surgical smoke evacuation system of FIG. 1 with a distal tip having an inward tapered surface in accordance with an aspect of the disclosure.

FIG. 5C illustrates a nozzle 212 in which the distal end portion 212b includes an inward tapered surface 212i (tapering toward the central longitudinal axis "L" of the nozzle 212 from an outer surface of the nozzle 212 to an inner surface of the nozzle 212) only. The inward tapered surface 212i directs light toward the central longitudinal axis "L" of the nozzle 212 and forms a spotlight pattern to be reflected off of a surface of the surgical site. In an aspect, the inward tapered surface 212i may be formed along only a portion of the circumference of the distal end portion 212b of the nozzle 212 to create a shaped (e.g., half-moon shaped) spotlight pattern to be reflected off of a surface of the surgical site.

Figure 5D:
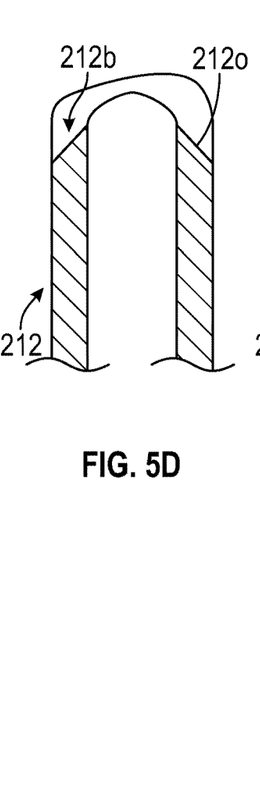
FIG. 5D is a side, cross-sectional, view of a light transmitting nozzle of the ES pencil of the surgical smoke evacuation system of FIG. 1 with a distal tip having an outward tapered surface in accordance with an aspect of the disclosure.

FIG. 5D illustrates a nozzle 212 in which the distal end portion 212b includes an outward tapered surface 212o (tapering away from the central longitudinal axis "L" of the nozzle 212 from an inner surface of the nozzle 212 to an outer surface of the nozzle 212) only. The outward tapered surface 212o directs light away from the central longitudinal axis "L" of the nozzle 212 and forms a rimmed pattern to be reflected off of a surface of the surgical site. In an aspect, the outward tapered surface 212o may be formed along only a portion of the circumference of the distal end portion 212b of the nozzle 212 to create a shaped (e.g., half-moon shaped) rimmed pattern to be reflected off of a surface of the surgical site.

Figure 5E:
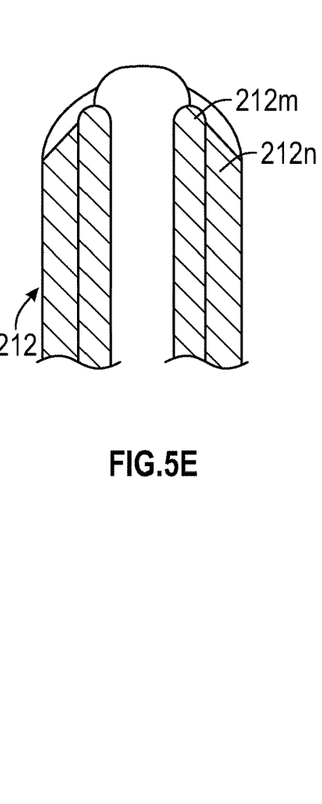
FIG. 5E is a side, cross-sectional, view of a multi-tube light transmitting nozzle of the ES pencil of the surgical smoke evacuation system of FIG. 1 in accordance with an aspect of the disclosure.

FIG. 5E illustrates a nozzle 212 having multiple light-transmitting tubes (e.g., first tube 212m and second tube 212n), each capable of transmitting a separate light wavelength and/or generating a different light pattern to be reflected off of a surface of the surgical site. Although two tubes are illustrated in FIG. 5E, nozzle 212 may include any number of independent tubes for transferring light. In the example illustrated in FIG. 5E, the first tube 212m is coaxially arranged around the second tube 212n. Additionally, the first tube 212m includes a distal end portion forming one shape, while the distal end portion of the second tube 212n forms a different shape, though the distal end portions of both the first tube 212m and the second tube 212n may be the same.

It will be understood that various modifications may be made to the aspects of the presently disclosed smoke evacuation ES pencils. Therefore, the above description should not be construed as limiting but merely as exemplifications of aspects. Those skilled in the art will envision other modifications within the scope and spirit of the disclosure.

What is claimed is:

1. An electrosurgical pencil comprising:
a handle housing having a proximal end portion and a distal end portion, the handle housing defining a lumen therethrough;
a suction conduit coupled to the handle housing, the suction conduit configured to couple the electrosurgical pencil to a smoke evacuator;
an electrode extending from the distal end portion of the handle housing and configured to couple to a source of electrosurgical energy; and
a nozzle extending from the distal end portion of the handle housing and defining a lumen in fluid communication with the lumen of the handle housing, wherein the nozzle is configured to transmit light from a light source through the nozzle and out of a distal end of the nozzle to form a light path illuminating therefrom, and wherein the distal end of the nozzle defines an inward tapered surface configured to direct light toward a central longitudinal axis of the nozzle.

2. The electrosurgical pencil according to claim 1, wherein the electrode is disposed within the lumen defined by the nozzle.

3. The electrosurgical pencil according to claim 1, further comprising an activator switch operably coupled to the handle housing and configured to activate the light source.

4. The electrosurgical pencil according to claim 3, wherein the activator switch is an adjustable switch configured to vary an intensity of the light path illuminating from the distal end of the nozzle.

5. The electrosurgical pencil according to claim 1, wherein the distal end of the nozzle further defines an outward tapered surface cooperating with the inward tapered surface to form a ridge configured to direct light away from the central longitudinal axis of the nozzle and toward the central longitudinal axis of the nozzle.

6. The electrosurgical pencil according to claim 1, wherein the distal end of the nozzle further defines an outward tapered surface configured to direct light away from the central longitudinal axis of the nozzle.

7. The electrosurgical pencil according to claim 1, wherein the distal end of the nozzle defines another inward tapered surface that cooperates with the inward tapered surface to form a valley.

8. A surgical smoke evacuation system, comprising:
a smoke evacuator including a suction generator configured to create a vacuum pressure; and
an electrosurgical pencil configured to operably couple to the smoke evacuator, the electrosurgical pencil including:
a handle housing having a proximal end portion and a distal end portion, the handle housing defining a lumen therethrough;
a suction conduit coupled to the handle housing, the suction conduit configured to couple the electrosurgical pencil to the smoke evacuator;
an electrode extending from the distal end portion of the handle housing and configured to couple to a source of electrosurgical energy; and
a nozzle extending from the distal end portion of the handle housing and defining a lumen in fluid communication with the lumen of the handle housing, wherein the nozzle is configured to transmit light from a light source through the nozzle and out of a distal end of the nozzle to form a light path illuminating therefrom, wherein the nozzle is a multi-tube nozzle including a first tube and a second tube, the first tube configured to transmit light at a first wavelength therethrough and the second tube configured to transmit light at a second wavelength therethrough.

9. The surgical smoke evacuation system according to claim 8, wherein the distal end of the nozzle includes an angled tip configured to cause the light path to illuminate away from a longitudinal axis of the nozzle and wherein the nozzle is rotatable relative to the handle housing to direct the light path illuminating away from the longitudinal axis of the nozzle.

10. The surgical smoke evacuation system according to claim 8, further comprising an activator switch operably coupled to the handle housing and configured to activate the light source, wherein the activator switch is an adjustable switch configured to vary an intensity of the light path illuminating from the distal end of the nozzle.

11. An electrosurgical pencil comprising:
   a handle housing having a proximal end portion and a distal end portion, the handle housing defining a lumen therethrough;
   a suction conduit coupled to the handle housing, the suction conduit configured to couple the electrosurgical pencil to a smoke evacuator;
   an electrode extending from the distal end portion of the handle housing and configured to couple to a source of electrosurgical energy;
   a light source disposed within the handle housing and configured to illuminate light;
   a nozzle extending from the distal end portion of the handle housing and defining a lumen in fluid communication with the lumen of the handle housing, wherein the nozzle is configured to transmit light illuminating from the light source through the nozzle and out of a distal end of the nozzle to form a light path illuminating therefrom, and wherein the distal end of the nozzle defines an outward tapered surface configured to direct light away from a central longitudinal axis of the nozzle.

12. The electrosurgical pencil according to claim 11, wherein the electrode is disposed within the lumen defined by the nozzle.

13. The electrosurgical pencil according to claim 11, further comprising an activator switch operably coupled to the handle housing and configured to activate the light source.

14. The electrosurgical pencil according to claim 13, wherein the activator switch is an adjustable switch configured to vary an intensity of the light path illuminating from the distal end of the nozzle.

15. The electrosurgical pencil according to claim 11, wherein the distal end of the nozzle further defines an inward tapered surface cooperating with the outward tapered surface to form a ridge configured to direct light away from the central longitudinal axis of the nozzle and toward the central longitudinal axis of the nozzle.

16. The electrosurgical pencil according to claim 11, wherein the distal end of the nozzle further defines an inward tapered surface configured to direct light towards the central longitudinal axis of the nozzle.

* * * * *